United States Patent Office 3,452,087
Patented June 24, 1969

3,452,087
PROCESS FOR THE AUTOXIDATION OF SUBSTITUTED BENZENES
James W. Patton, Littleton, and Ned F. Seppi, Denver, Colo., assignors to Marathon Oil Company, Findlay, Ohio, a corporation of Ohio
No Drawing. Filed May 8, 1967, Ser. No. 636,660
Int. Cl. C07c *51/16*
U.S. Cl. 260—524        8 Claims

ABSTRACT OF THE DISCLOSURE

The present invention comprises a process for the autoxidation of substituted benzenes substituted with from 1 to 3 substituent groups selected from the class consisting of alkyl groups, aldehydo groups, alcohol groups, and combinations thereof, in which substituent groups the carbon atom alpha to the ring is connected to from 0 to 2 other carbon atoms, said process comprising in combination the steps of reacting said substituted benzenes with oxygen in the conjoint presence of a catalytic amount of transition metal or salt thereof and an effective amount of 2,3-epoxy-butane at a temperature of from about 50 to about 250° C. The products of the invention comprise acids, e.g. terephthalic acid, isophthalic acid, trimesic acid, and benzoic acid. The polycarboxylic acids of the present invention are useful for the production of a wide variety of polymers, e.g. polyesters, polyamides, etc. Benzoic acid is a widely used starting material for the production of other organic compounds, as a mordant in dye printing processes, in the seasoning of tobacco, in flavors and perfumes.

BACKGROUND OF THE INVENTION

Field of the invention

The present invention relates to the field of autoxidation (that is, oxidation with oxygen under conditions which do not produce free flames) of substituted benzenes which are substituted with hydrocarbon groups in the presence of transition metal catalysts wherein such autoxidation reactions are enhanced by the additional presence of an activator which is co-oxidized simultaneously with the substituted benzenes.

Description of the prior art

A variety of processes have been previously taught involving the autoxidation of hydrocarbon substituted benzenes in the presence of transition metal catalysts. Certain of these have also involved the presence of activators which are co-oxidized simultaneously with the oxidation of the alkyl benzenes. However, to the best of our knowledge, no previous process has taught the co-oxidation of such substituted benzenes in the presence of the activator which has been discovered in the present invention.

SUMMARY

The present invention embodies the discovery that 2,3-epoxybutane is a highly effective activator for autoxidation processes involving the oxidation of substituted benzenes which are substituted with from 1 to 3 hydrocarbon groups which can be alkyl, aldehydo, or alcohol groups. Preferably the substituting hydrocarbon groups will not be adjacent on the ring and will contain from about 1 to 10, more preferably from 1 to about 6, and most preferably from 1 to about 3 carbon atoms per group. In such groups the alpha carbon atoms should be connected from 0 to 2 other carbon atoms, and the groups can contain double or triple bonds. The groups in a single nucleus can be the same or different, and the nucleus may also contain other non-hydrocarbon, non-interferring groups which are not affected by the conditions of the present reaction, e.g. halides.

The efficacy of 2,3-epoxybutane for the purposes of the present invention is especially unexpected and surprising in view of the much lower enhancement provided by structurally similar compounds, e.g. 1,2-epoxybutane, propylene oxide, and 2-methyl-1,2-epoxypropane.

As used herein the term "transition metal catalyst" means the metals having atomic numbers of 21-30, 39-48, 57-80 inclusive, and the soluble (in the reaction mixtures of the present invention) salts thereof. A transition metal catalyst of the present invention will be present in catalytic amounts, preferably in amounts sufficient to render the reaction mixture from 0.001 to 1.0 molar in the metal ions, more preferably from 0.05 to 0.5 molar, and most preferably from 02. to 0.3 molar. Manganese, and particularly, cobalt and their salts are preferred for the present invention.

While not absolutely necessary to the practice of the present invention, solvents may be added to the reaction mixture. Such solvents should be oxygen-containing hydro-carbons which are both liquid and not subject to further oxidation under the conditions of the reaction. Because of its stability, low cost, and wide availability, acetic acid is the most preferred solvent for the purposes of the present invention. The solvent may be used in varying amounts with amounts of from about 0.02:1 to about 50:1 based on the volume of substituted benzenes present in the reaction mixture being preferred.

While not narrowly critical, temperatures in the practice of the present invention will preferably be from 50 to about 250° C., with temperatures of 75 to 175° C. being more preferred, and temperatures of 100 to about 135° C. being most preferred. Similarly, while not narrowly critical, pressures of from 0 to about 2,000 p.s.i.g., more preferably from 50 to about 1,000 p.s.i.g., and most preferably from 75 to about 250 p.si.g., will be prefered for the present invention. All of the pressures given above are the partial pressures of oxygen, and the total pressure may be increased above such values by dilution with nitrogen or other gases. Air may be used in the practice of the present invention. In all cases, the partial pressure of oxygen should be carefully controlled in order to regulate the considerable exotherm of the reaction and prevent explosions or combustion.

In most cases, it will be convenient to control the progress of the reaction and to determine when to discontinue the reaction by watching the oxygen absorption rate. Oxygen flow is not especially critical, but will generally be regulated so as to accomplish the oxidation of the reaction mixture to the desired degree within a time interval of about 0.1 to about 10.0 hours, more preferably from 0.3 to about 5 hours, and most preferably from about 0.5 to about 3 hours.

While the present invention will normally be conducted on a batch basis, it may readily be adapted to a continuous basis with the substituted benzenes, oxygen, catalyst, and activator being continuously added to a reaction zone, and the products continuously removed from the reaction zone.

EXAMPLE I

A Fischer-Porter glass areosol compatibility tube is charged with 3.00 ml. of p-xylene, in 25 ml. of 2.0 M cobaltous acetate in acetic acid. One-half ml. of a 20% solution of acetaldehyde in acetic acid is added to help initiate the autoxidation, to decrease the induction time to about 10 minutes. The solution is stirred magnetically in an oil bath at 100° C. The vessel is maintained under a constant pressure of 150 p.s.i.g. with oxygen fed from a pressure reservoir. As the p-xylene autoxidation proceeds, after the brief induction time, the oxygen consumption rate increases and the exothermic reaction causes the tube contents to increase in temperature about 50° C. above the oil bath temperature at 100° C. After this exotherm has subsided, the reaction rates slows down to a low level. At this time, 1.00 ml. of 2,3-epoxybutane is added, while the reaction is in progress, from a pressurized addition tube. After a total reaction time of 2.5 hours, a yield of 89.8% terephthalic acid is obtained.

EXAMPLE II

The process of Example I is repeated except no activator is added after the exotherm. A 50.0% yield of terephthalic acid is obtained.

EXAMPLE III

The process of Example I is repeated except 1 ml. of 3-acetoxy-2-butanol is added as the activator after the exotherm. After 4.4 hours a 78.4% yield of terephthalic acid is obtained. 3-acetoxy-2-butanol is the solvolysis product of 2,3-expoxybutane and acetic acid. Although this material gave an improved yield compared to no activator, it is inferior to 2,3-epoxybutane itself.

EXAMPLE IV

The process of Example I is repeated, but 1 ml. of 1,2-epoxypropane is added as the activator after the exotherm. After 4.4 hours a yield of only 39.9% of terephthalic acid is obtained.

EXAMPLE V

The process of Example I is repeated except 1 ml. of 1,2-epoxybutane is added as the activator. After a total reaction time of 4.4 hours, a yield of terephthalic acid of only 44.6% is obtained.

EXAMPLE VI

The process of Example I is repeated except 1 ml. of 2-methyl-1,2-epoxypropane is added as the activator after the exotherm. After a total reaction time of 4.4 hours, yield of only 33.3% of terephthalic acid is obtained.

EXAMPLE VII

When equal amounts of meta-xylene are substituted for the para-xylene of Example I, substantially higher yields of isophthalic acid are obtained as compared to those obtained when the other closely structurally similar activators are utilized.

EXAMPLE VIII

When equal amounts of toluene are substituted for the para-xylene of Example I, substantially higher yields of benzoic acid are obtained as compared to those obtained when the other closely structurally similar activators are utilized.

EXAMPLE IX

When equal amounts of para-dihexylbenzene are substituted for the para-xylene of Example I, substantially higher yields of terephthalic acid are obtained as compared to those obtained when the other closely structurally similar activators are utilized.

EXAMPLE X

When equal amounts of para-dibenzyl alcohol are substituted for the para-xylene of Example I, substantially higher yields of terephthalic acid are obtained as compared to those obtained when the other closely structurally similar activators are utilized.

EXAMPLE XI

When equal amounts of terephthaldehyde are substituted for the para-xylene of Example I, substantially higher yields of terephthalic acid are obtained as compared to those obtained when the other closely structurally similar activators are utilized.

Is should be understood that the present invention is susceptible to a wide variety of modifications and variations which will be obvious to those skilled in the art, and which are to be taken as being within the spirit of the claims appended hereto.

What is claimed is:

1. A process for the autoxidation of substituted benzenes substituted with from 1 to 3 substituent groups selected from the class consisting of alkyl groups, aldehydo groups, alcohol groups, and combinations thereof, in which substituent groups the carbon atom alpha to the ring is connected to from 0 to 2 other carbon atoms, said process comprising in combination the steps of reacting said substituted benzenes with oxygen in the conjoint presence of a catalytic amount of a transition metal or salt thereof and an effective amount of 2,3-epoxybutane at a temperature of from about 50 to about 250° C.

2. The process of claim 1 in which the compounds are reacted in a reaction mixture which is from about 0.01 to about 2.0 molar in cobalt ions based on the total reaction mixture and wherein there are present from 0.5 to about 50% by volume of 2,3-epoxybutane.

3. The process of claim 2 in which there is additionally present an oxygen containing solvent resistant to further oxidation under the conditions of the reaction and capable of maintaining a single phase reaction mixture.

4. The process of claim 1 in which the substituted benzenes comprise a major portion of meta-xylene.

5. The process of claim 1 in which the substituted benzenes comprise a major portion of para-xylene.

6. The process of claim 1 wherein the substituted benzenes comprise a major portion of toluene.

7. The process of claim 1 wherein the substituted benzenes comprise a major portion of mesitylene.

8. The process of claim 1 wherein the transition metal catalyst is selected from the group consisting of cobalt, manganese, salts thereof, and mixtures of the aforenamed metals and salts.

References Cited

UNITED STATES PATENTS 2,245,528   6/1941   Loder _____ 260—524

LORRAINE A. WEINBERGER, *Primary Examiner.*

R. S. WEISSBERG, *Assistant Examiner.*

U.S. Cl. X.R.

260—523

IN THE UNITED STATES PATENT OFFICE

CERTIFICATE OF CORRECTION

Patent No. 3,452,087　　　　　　　　　　Dated June 24, 1969

James W. Patton and Ned F. Seppi

It is certified that error appears in the above-identified patent and that said Letters Patent are hereby corrected as shown below:

In the patent,

Col. 2, line 17　reads: "02."　　　should read: --0.2--

Col. 2, line 38　reads: "prefered"　should read: --preferred--

Col. 3, line 27　reads: "39.9"　　should read: --39.3--

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents